United States Patent [19]

Hao et al.

[11] Patent Number: 5,756,746
[45] Date of Patent: May 26, 1998

[54] MONOPHASE SOLID SOLUTIONS CONTAINING ASYMMETRIC PYRROLO [4, 3-C] PYRROLES AS HOSTS

[75] Inventors: Zhimin Hao, Marly; Abul Iqbal, Arconciel, both of Switzerland

[73] Assignee: Ciba Specialty Chemicals Corporation, Tarrytown, N.Y.

[21] Appl. No.: 700,349

[22] Filed: Sep. 23, 1996

[30] Foreign Application Priority Data

Sep. 26, 1995 [CH] Switzerland ............... 2719/95

[51] Int. Cl.$^6$ .......................... C09B 67/22; C09B 67/52; C07D 209/00; C07D 487/04
[52] U.S. Cl. .......................... 546/56; 106/495; 106/496; 106/497; 106/498; 544/106; 546/49; 546/251; 548/513; 548/515; 548/453
[58] Field of Search .................. 546/56; 548/453

[56] References Cited

U.S. PATENT DOCUMENTS

| | | | |
|---|---|---|---|
| 4,783,540 | 11/1988 | Bäbler | 548/453 |
| 4,810,304 | 3/1989 | Jaffe et al. | 106/494 |
| 5,529,623 | 6/1996 | Hendi et al. | 106/495 |

FOREIGN PATENT DOCUMENTS 0256983  2/1988  Germany .

OTHER PUBLICATIONS

Derwent abstract 96–173008/18 of EP 0704497.

*Primary Examiner*—Johann Richter
*Assistant Examiner*—Jane C. Osowecki
*Attorney, Agent, or Firm*—Kevin T. Mansfield

[57] ABSTRACT

The present invention relates to a solid solution consisting of 60–90 mol-% of an asymmetric 2,5-dihydro-1,4-diketopyrrolo[3,4-c]pyrrole of the formula (I)

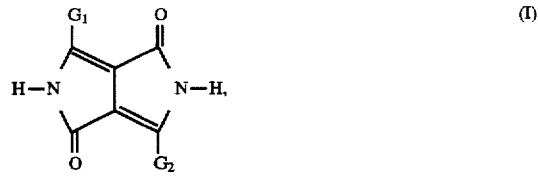

in which $G_1$ and $G_2$ independently of one another are different substituted or unsubstituted aromatic radicals or pyridyl, but the volume of all substituents on $G_1$ and $G_2$ is greater than that of two methyl groups;

and 40–10 mol-% of a 2,5-dihydro-1,4-diketopyrrolo[3,4-c] pyrrole of the formula (IIa)

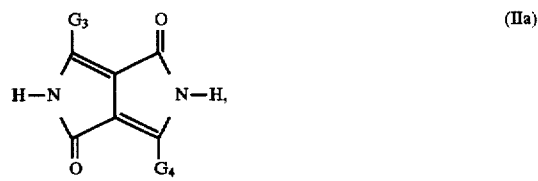

in which $G_3$ and $G_4$ independently of one another are different substituted or unsubstituted aromatic radicals or pyridyl, but the volume of all substituents on $G_3$ and $G_4$ is less than that of two butoxy groups;

or 40–10 mol-% of a quinacridone of the formula (IIb)

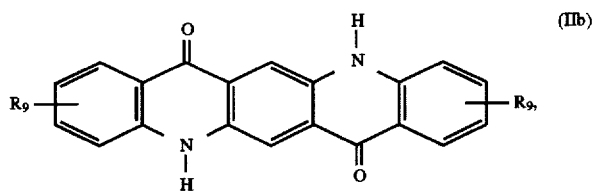

in which $R_9$ is hydrogen, halogen, $C_1$–$C_4$ alkyl or $C_1$–$C_4$ alkoxy;

which is a single-phase solid solution having the crystal structure of the asymmetric 2,5-dihydro-1,4-diketopyrrolo [3,4-c]pyrrole of the formula (I).

15 Claims, No Drawings

MONOPHASE SOLID SOLUTIONS CONTAINING ASYMMETRIC PYRROLO [4,3-C] PYRROLES AS HOSTS

The present invention relates to novel single-phase solid solutions of a substituted, asymmetric 2,5-dihydro-1,4-diketopyrrolopyrrole and a 2,5-dihydro-1,4-diketopyrrolopyrrole or a quinacridone, and to their use as pigments.

2,5-Dihydro-1,4-diketopyrrolopyrroles (DPPs), including asymmetric DPPs of the type

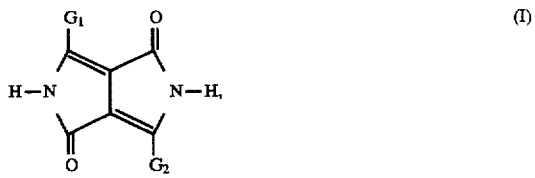

their preparation and their use as pigments, are described, for example, in U.S. Pat. No. 4,579,949. DPPs of this kind are also known constitutents of solid solutions, from U.S. Pat. No. 4,783,540 and U.S. Pat. No. 4,810,304.

U.S. Pat. No. 4,783,540 describes how, when mixing two different 2,5-dihydro-1,4-diketopyrrolopyrroles and then treating the mixture by kneading, grinding or reprecipitation, it is possible to obtain solid solutions. Examples of asymmetric DPPs of the formula (I) which are illustrated are 3-phenyl-6-(3-chlorophenyl)-2,5-dihydro-1,4-diketopyrrolopyrrole and 3-phenyl-6-(4-chlorophenyl)-2,5-dihydro-1,4-diketopyrrolopyrrole, which are used together with symmetrical DPPs [including those of the formula (IIa), in which $G_3$ and $G_4$ are identical].

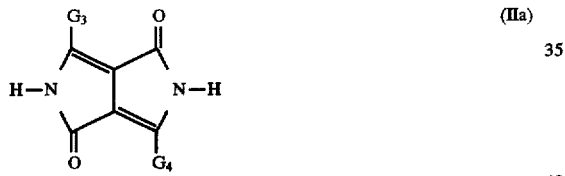

U.S. Pat. No. 4,810,304 describes how, when mixing a 2,5-dihydro-1,4-diketopyrrolopyrrole and a quinacridone [including those of formula (IIb)] and then treating the mixture by kneading, grinding or reprecipitation, it is likewise possible to obtain solid solutions. No examples are given which have asymmetric DPP s of the formula (I) as components.

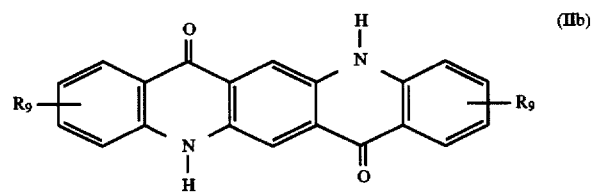

The X-ray diffraction diagrams of these solid solutions are in both cases different from the sum of the X-ray diffraction diagrams of the individual components. In all of the products obtainable in accordance with the disclosed examples, however, they are also markedly different from the X-ray diffraction diagrams of the pure crystalline individual components. The solutions involved, therefore, are exclusively multiphase solid solutions, which have no precise, uniform crystal lattice. Moreover, these products are obtained in an undesirable, largely amorphous form.

It has additionally been found that multiphase solid solutions of this kind do not go as far as is desired towards meeting the requirements made of them, for example high light stability and weather stability and a precisely reproducible shade.

It has now been found that single-phase solid solutions with surprisingly high light stability and weather stability and a precisely reproducible shade are obtained if the host used is an asymmetric 2,5-dihydro-1,4-diketopyrrolopyrrole of the formula (I) having defined groups $G_1$, and $G_2$, and the guest used is, in defined molar ratios, a 2,5-dihydro-1,4-diketopyrrolopyrrole of the formula (IIa) having defined groups $G_3$ and $G_4$ or a quinacridone of the formula (IIb) having defined substituents $R_9$. The crystallinity of these single-phase solid solutions is excellent, characterized by Bragg angle lines with a mid-peak width of $\leq 1.0$ $2\Theta$, preferably $\leq 0.8$ $2\Theta$, in their X-ray diffraction diagram. The X-ray diffraction diagram of the single-phase solid solution is in each case almost identical with that of the pure asymmetric 2,5-dihydro-1,4-diketopyrrolopyrrole of the formula (I); in other words, the guest in each case gives up its crystalline structure completely, and the resulting single-phase solid solution is isomorphous with the host. There are also no mixed crystals.

In the literature, the definitions used by the various authors, such as, G. H. Van't Hoff, A. I. Kitaigorodsky and A. Whitacker for solid solutions and mixed crystals are often contradictory, (cf. e.g. "Analytical chemistry of synthetic dyes", Chapter 10/page 269, Editor K. Venkataraman, J. Wiley, New York 1977).

What is understood in this document by "single-phase solid solution", "multiphase solid solution" or "mixed crystal", therefore, should be taken from the following new definitions, which have been adapted to the current, improved state of knowledge of such systems:

A multiphase solid solution possesses no precise, uniform crystal lattice. It differs from a physical mixture of its individual components in that the crystal lattice of at least one of its components is partially or completely altered. In comparison to the physical mixture of the components, the signals in the X-ray diffraction diagram are broadened, shifted or altered in intensity. In general, different proportions of the components produce different results.

A single-phase (or monophase) solid solution possesses a crystal lattice which is identical with the crystal lattice of one of its components. One component is embedded as the "guest" in the crystal lattice of the other component, which acts as "host". Within certain limits, different proportions of the components produce almost identical results.

A mixed crystal possesses a precise composition and a uniform crystal lattice, which is different from the crystal lattices of all of its components. If different proportions of the components lead, within certain limits, to the same result, then a solid solution is present in which the mixed crystal acts as host.

In order to rule out any misunderstanding it may also be pointed out that, inter alia, there may also be amorphous structures, and mixed aggregates consisting of different particles of different physical type, such as, for example, an aggregate of different components each in pure crystal modification. Such amorphous structures and mixed aggregates cannot be equated with either solid solutions or mixed crystals, and possess different fundamental properties.

The present invention accordingly provides a solid solution consisting of 60–90 mol-% of an asymmetric 2,5-dihydro-1,4-diketopyrrolo[3,4-c]pyrrole of the formula (I)

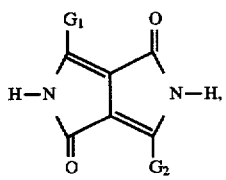
(I)

in which $G_1$ and $G_2$ independently of one another are different radicals

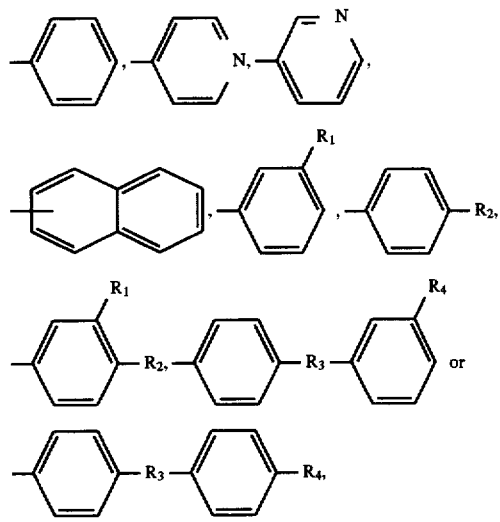

where $R_1$ and $R_2$ independently of one another are fluorine, chlorine, bromine, cyano, nitro, trifluoromethyl, $C_1$–$C_8$alkyl, $C_5$–$C_6$cycloalkyl, phenyl, $C_1$–$C_8$alkoxy, $C_1$–$C_8$alkoxycarbonyl, $C_1$–$C_8$alkylamino, $C_1$–$C_8$alkylaminocarbonyl, $C_1$–$C_8$dialkylamino, $C_1$–$C_8$dialkylaminocarbonyl or morpholino, $R_3$ is —O—, —NR$_5$—, —N=N— or —SO$_2$—, $R_4$ is hydrogen, fluorine, chlorine, bromine, cyano, nitro, trifluoromethyl, $C_1$–$C_8$alkyl, $C_1$–$C_8$alkoxy, $C_1$–$C_8$alkylamino, $C_1$–$C8$dialkylamino, $C_1$–$C_8$alkoxycarbonyl, $C_1$–$C_8$alkylaminocarbonyl or $C_1$–$C_8$dialkylaminocarbonyl, and $R_5$ is hydrogen, methyl or ethyl, although, if one of the radicals, $G_1$ or $G_2$, is

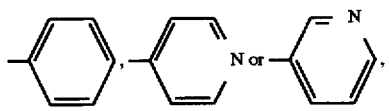

the other radical, $G_2$ or $G_1$, is not

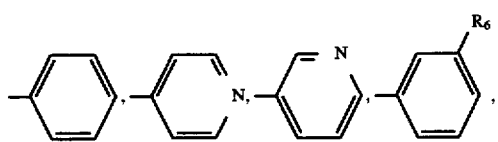

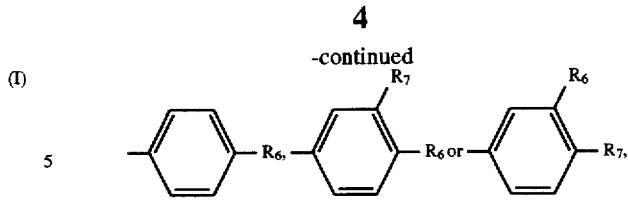

where $R_6$ is chlorine and $R_7$ is fluorine or trifluoromethyl, or $R_6$ and $R_7$ independently of one another are fluorine, methyl or trifluoromethyl;

and 40–10 mol-% of a 2,5-dihydro-1,4-diketopyrrolo[3,4-c]pyrrole of the formula (IIa)

(IIa)

in which $G_3$ and $G_4$ independently of one another are identical or different radicals where $R_8$ is fluorine, chlorine, cyano, nitro, trifluoromethyl, $C_1$–$C_4$alkyl, $C_1$–$C_4$alkoxy, $C_1$–$C_4$alkylamino or $C_1$–$C_4$dialkylamino;

or 40–10 mol-% of a quinacridone of the formula (IIb)

(IIb)

in which $R_9$ is hydrogen, halogen, $C_1$–$C_4$alkyl or $C_1$–$C_4$alkoxy;

which is a single-phase solid solution having the crystal structure of the asymmetric 2,5-dihydro-1,4-diketopyrrolo [3,4-c]pyrrole of the formula (I).

$C_1$–$C_8$alkyl is, for example, methyl, ethyl, n-propyl, isopropyl, n-butyl, sec-butyl, tert-butyl, n-amyl, tert-amyl, n-hexyl, n-heptyl, n-octyl, 2-ethylhexyl or 2,4,4-trimethyl-2-pentyl.

$C_1$–$C_8$alkoxy, alone or in $C_1$–$C_8$alkoxycarbonyl, is —O–$C_1$–$C_8$alkyl, such as methoxy, ethoxy, n-propoxy, isopropoxy, butyloxy, hexyloxy or octyloxy.

$C_1$–$C_8$alkylamino alone or in $C_1$–$C_{18}$alkylaminocarbonyl, is —NH–$C_1$–$C_8$alkyl, such as methylamino, ethylamino, propylamino, hexylamino or octylamino.

$C_2$–$C_8$dialkylamino, alone or in $C_1$–$C_{18}$dialkylaminocarbonyl, is

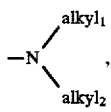

in which the number of carbon atoms in both alkyl groups totals 2 to 8, such as dimethylamino, diethylamino, dipropylamino, dibutylamino, methylhexylamino or ethylhexylamino.

$C_5$–$C_6$cycloalkyl is, for example, cyclopentyl and, in particular, cyclohexyl.

Preference is given to asymmetric 2,5-dihydro-1,4-diketopyrrolo[3,4-c]pyrroles of the formula (I)

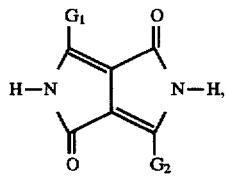

(I)

in which $G_1$ and $G_2$ independently of one another are different radicals

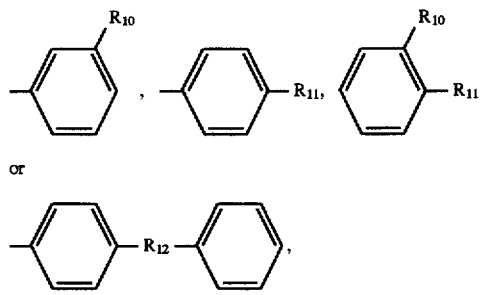

where $R_{10}$ and $R_{11}$ independently of one another are chlorine, bromine, cyano, nitro, trifluoromethyl, $C_1$–$C_8$alkyl, phenyl, $C_1$–$C_8$alkoxy, $C_1$–$C_8$alkoxycarbonyl, $C_1$–$C_8$alkylamino or $C_1$–$C_8$dialkylamino, and $R_{12}$ is —$NR_5$— or —$SO_2$—.

Particular examples which may be mentioned of preferred asymmetric 2,5-dihydro-1,4-diketopyrrolo[3,4-c]pyrroles of the formula (I) are:

3-(4'-chlorophenyl)-6-(3'-methylphenyl)-2,5-dihydro-1,4-diketopyrrolo[3,4-c]pyrrole,
3-(4'-chlorophenyl)-6-(4'-methylphenyl)-2,5-dihydro-1,4-diketopyrrolo[3,4-c]pyrrole,
3-phenyl-6-(4'-biphenylyl)-2,5-dihydro-1,4-diketopyrrolo[3,4-c]pyrrole,
3-phenyl-6-(4'-tert-butylphenyl)-2,5-dihydro-1,4-diketopyrrolo[3,4-c]pyrrole,
3-phenyl-6-(3',4'-dichlorophenyl)-2,5-dihydro-1,4-diketopyrrolo[3,4-c]pyrrole,
3-(4'-chlorophenyl)-6-(4'-biphenylyl)-2,5-dihydro-1,4-diketopyrrolo[3,4-c]pyrrole,
3-(4'-chlorophenyl)-6-(4'-tert-butylphenyl)-2,5-dihydro-1,4-diketopyrrolo[3,4-c]pyrrole,
3-(4'-chlorophenyl)-6-(3'-methylphenyl)-2,5-dihydro-1,4-diketopyrrolo[3,4-c]pyrrole and
3-(4'-chlorophenyl)-6-(3'-cyanophenyl)-2,5-dihydro-1,4-diketopyrrolo[3,4-c]pyrrole.

Particular preference is given to asymmetric 2,5-dihydro-1,4-diketopyrrolo[3,4-c]pyrroles of the formula (I)

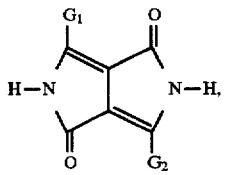

(I)

in which $G_1$ is a radical

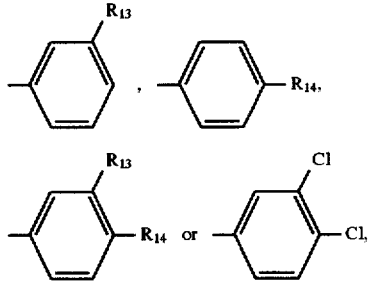

where $R_{13}$ and $R_{14}$ are nitro, $C_4$–$C_8$alkyl, phenyl, $C_4$–$C_8$alkoxy or $C_4$–$C_8$dialkylamino, especially tert-butyl or phenyl, and in which $G_2$ is a radical which is different from $G_1$ and corresponds to the definition given right at the beginning.

These particularly preferred asymmetric 2,5-dihydro-1,4-diketopyrrolo[3,4-c]pyrroles of the formula (I) prove, with particular surprise, to be hosts suitable for forming monophase solid solutions even when $G_2$ is unsubstituted phenyl.

Examples which may be mentioned of particularly preferred asymmetric 2,5-dihydro-1,4-diketopyrrolo[3,4-c] pyrroles of the formula (I) are:

3-phenyl-6-(4'-biphenylyl)-2,5-dihydro-1,4-diketopyrrolo [3,4-c]pyrrole,
3-phenyl-6-(4'-tert-butylphenyl)-2,5-dihydro-1,4-diketopyrrolo[3,4-c]pyrrole and
3-phenyl-6-(3',4'-dichlorophenyl)-2,5-dihydro-1,4-diketopyrrolo[3,4-c]pyrrole.

Very particular preference is given to asymmetric 2,5-dihydro-1,4-diketopyrrolo[3,4-c]-pyrroles of the formula (I)

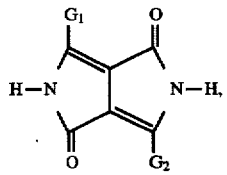

(I)

in which $G_1$ and $G_2$ independently of one another are different radicals

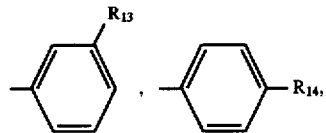

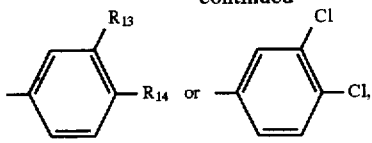

where $R_{13}$ and $R_{14}$ are nitro, $C_4$–$C_8$alkyl, phenyl, $C_4$–$C_8$alkoxy or $C_4$–$C_8$dialkylamino, especially tert-butyl or phenyl.

Examples which may be mentioned of very particularly preferred asymmetric 2,5-dihydro-1,4-diketopyrrolo[3,4-c]pyrroles of the formula (I) are:

3-(4'-chlorophenyl)-6-(4'-biphenylyl)-2,5-dihydro-1,4-diketopyrrolo[3,4-c]pyrrole,
3-(4'-chlorophenyl)-6-(4'-tert-butylphenyl)-2,5-dihydro-1,4-diketopyrrolo[3,4-c]pyrrole,
3-(4'-chlorophenyl)-6-(3',4'-dichlorophenyl)-2,5-dihydro-1,4-diketopyrrolo[3,4-c]pyrrole,
3-(4'-chlorophenyl)-6-(3'-methylphenyl)-2,5-dihydro-1,4-diketopyrrolo[3,4-c]pyrrole and
3-(4'-chlorophenyl)-6-(3'-cyanophenyl)-2,5-dihydro-1,4-diketopyrrolo[3,4-c]pyrrole.

Preference is given to 2,5-dihydro-1,4-diketopyrrolo[3,4-c]pyrroles of the formula (IIa),

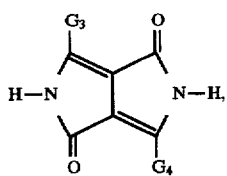

in which $G_3$ and $G_4$ independently of one another are identical or different radicals

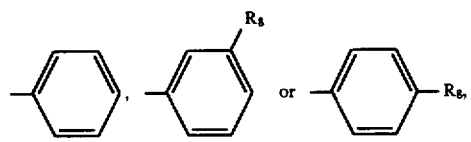

where $R_8$ is fluorine, chlorine, cyano, nitro, trifluoromethyl, $C_1$–$C_4$alkyl, $C_1$–$C_4$alkoxy, $C_1$–$C_4$alkylamino or $C_1$–$C_4$dialkylamino.

Particular preference is given to 2,5-dihydro-1,4-diketopyrrolo[3,4-c]pyrroles of the formula (IIa),

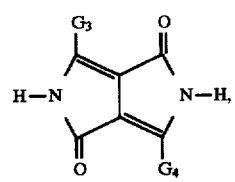

in which $G_3$ and $G_4$ independently of one another are identical or different radicals

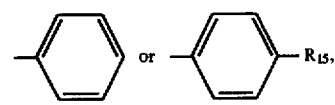

where $R_{15}$ is chlorine, nitro, trifluoromethyl, methyl, methoxy, methylamino or dimethylamino.

Particular preference attaches, in particular, to the symmetrical compounds of the formula (IIa), in which $G_3$ and $G_4$ are identical.

Preferred quinacridones are those of the formula (IIb),

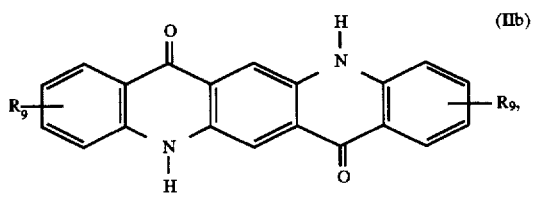

in which $R_9$ is hydrogen, halogen or methyl.

Particularly preferred quinacridones of the formula (IIb) are unsubstituted quinacridone, 2,9-dichloroquinacridone or 2,9-dimethylquinacridone.

As guest it is expedient to employ compounds of the formula (IIa) or (IIb) whose spatial bulk is less than that of the host of the formula (I). As a measure of the spatial bulk of a compound it is possible to divide the volume of its unit cell, which can be determined by X-ray structural analysis of a monocrystal, by the number of molecules in the unit cell. If it is not possible, for example because no suitable crystal is available, then the spatial bulk can also be calculated, or at least estimated with entirely sufficient accuracy, using one of the many available computer simulation programs, or manually using the customary standard values, which can be found in tabular works such as "Handbook of Chemistry and Physics" (CRC Press, 76$^{th}$ edition, 1995/96, section 9) for bond lengths, bond angles and Van der Waals radii. The person skilled in the art is able, however, without any calculation, to realize, for example, that the spatial bulk of 3,6-di(4-chlorophenyl)-2,5-dihydro-1,4-diketopyrrolopyrrole is much smaller than that of 3-(4-biphenylyl)-6-(4-tert-butyl)-phenyl-2,5-dihydro-1,4-diketopyrrolopyrrole.

The molar concentrations are preferably 75–90 mol-% of an asymmetric 2,5-dihydro-1,4-diketopyrrolo[3,4-c]pyrrole of the formula (I) and 25–10 mol-% of a 2,5-dihydro-1,4-diketopyrrolo[3,4-c]pyrrole of the formula (IIa) or of a quinacridone of formula (IIb).

The molar concentrations are particularly preferably 75–84 mol-% of an asymmetric 2,5-dihydro-1,4-diketopyrrolo[3,4-c]pyrrole of the formula (I) and 25–16 mol-% of a 2,5-dihydro-1,4-diketopyrrolo[3,4-c]pyrrole of the formula (IIa) or of a quinacridone of the formula (IIb).

The 2,5-dihydro-1,4-diketopyrrolo[3,4-c]pyrroles of the formulae (I) and (IIa) and the quinacridones of the formula (IIb) are known substances. Should any of them still be new, they can be prepared from known substances in analogy to generally known methods. In particular, asymmetric 2,5-dihydro-1,4-diketopyrrolo[3,4-c]pyrroles of the formulae (I) and (IIa) can be prepared in pure form by the method described in U.S. Pat. No. 4,778,899.

The novel single-phase solid solutions can be prepared, starting from physical mixtures of the above-defined components of the formulae (I) and (IIa) or (IIb) by the following methods, which are known per se:

- by contacting in polar organic solvents, preferably by stirring the mixture of components together at reflux temperature,
- by intensive grinding or kneading of the mixture of components,
- by acidic reprecipitation, i.e. by dissolving the mixture of components in acid and precipitating the solid solution by dilution with water, by alkaline reprecipitation of the mixture of components in polar organic solvents, or by stirring the mixture of components together in polar organic solvents in the presence of alkali metal alcoholates, alkali metal hydroxides or quaternary ammonium compounds, it being possible to carry out the procedure in analogy to the methods described in detail, for example, in U.S. Pat. No. 4,783,540.

A new preparation method consists in

[1] reacting the compounds of the formulae (I) and (IIa) or (IIb) by methods known per se with a dicarbonate of the formula L—O—L (III), or with a trihaloacetate of the formula $(R_{16})_3C$—L (IV), or with an azide of the formula L—$N_3$ (V), or with a carbonate of the formula L—$OR_{17}$ (VI), or with an alkylideneiminooxyformate of the formula

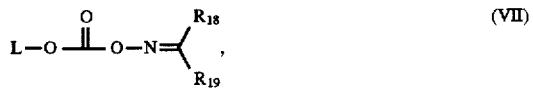 (VII)

in which L is a group of the formula

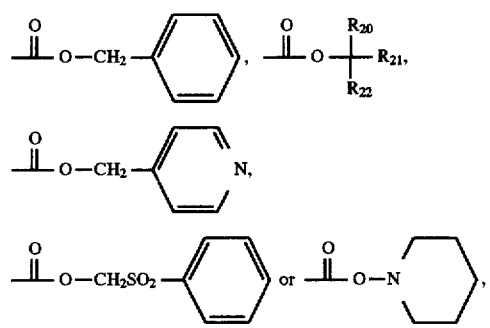

$R_{16}$ is chlorine, fluorine or bromine, $R_{17}$ is $C_1$–$C_4$alkyl or phenyl or halogen-, $C_1$–$C_4$alkyl-, $C_1$–$C_4$alkoxy- or —CN-substituted phenyl, $R_{18}$ is —CN or —$COOR_{15}$, $R_{19}$ is phenyl or halogen-, $C_1$–$C_4$alkyl-, $C_1$–$C_4$alkoxy- or —CN-substituted phenyl, $R_{20}$ is hydrogen, $C_1$–$C_6$alkyl, $C_2$–$C_5$alkenyl or $C_2$–$C_5$alkynyl, and $R_{21}$ and $R_{22}$ independently of one another are $C_1$–$C_6$alkyl, $C_2$–$C_5$alkenyl or $C_2$–$C_5$alkynyl, in a molar ratio of 1:2 to 1:3 in an aprotic organic solvent in the presence of a base as catalyst, to give soluble pigment precursors of the formula

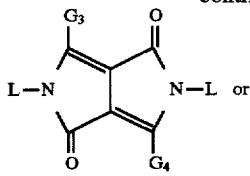 (VIII)

-continued

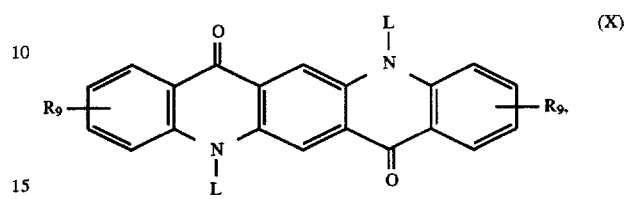

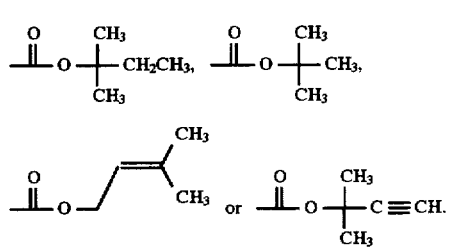 (X)

in which $G_1$ to $G_4$ and $R_9$ are as defined above.

[2] homogeneously mixing these soluble pigment precursors in an inert liquid, in the molar proportions desired for the solid solutions, and in dry form or as a suspension or solution; and then

[3] precipitating the desired single-phase solid solution from the dry, suspended or dissolved mixture by thermal, photolytic or chemical treatment or a combination thereof.

$C_2$–$C_5$alkenyl $R_{20}$, $R_{21}$ and $R_{22}$ is, for example, vinyl, allyl, methallyl, n-but-2-enyl, 2-methylprop-2-enyl or n-pent-2-enyl, and $C_2$–$C_5$alkynyl $R_{20}$, $R_{21}$ and $R_{22}$ is, for example, ethynyl, prop-2-ynyl, but-2-ynyl, but-3-ynyl, 2-methyl-but-3-ynyl or 2,2-dimethylprop-2-ynyl.

Preferably, $R_{20}$ and $R_{21}$ are methyl and $R_{22}$ is $C_1$–$C_6$alkyl, in particular likewise methyl.

L is preferably a group of the formula

The compounds of the formulae (I), (IIa) and (IIb) are preferably reacted to give the compounds of the formulae (VIII), (IX) and (X) using a dicarbonate of the formula (III).

The dicarbonates of the formula (III), trihaloacetates of the formula (IV), azides of the formula (V), carbonates of the formula (VI) and alkylideneiminooxyformates of the formula (VII) are known substances. Should any still be new, they can be prepared in analogy to generally known methods.

Examples of suitable aprotic organic solvents are ethers, such as tetrahydrofuran or dioxane, or glycol ethers, such as ethylene glycol methyl ether, ethylene glycol ethyl ether, diethylene glycol monomethyl ether or diethylene glycol monoethyl ether, and also dipolar aprotic solvents, such as acetonitrile, benzonitrile, N,N-dimethylformamide, N,N-dimethylacetamide, nitrobenzene, N-methylpyrrolidone, halogenated aliphatic hydrocarbons, such as dichloromethane, trichloroethane, aromatic hydrocarbons, such as benzene, or alkyl-, alkoxy- or halo-substituted benzene, such as toluene, xylene, anisole or chlorobenzene, or aromatic N-heterocycles, such as pyridine, picoline or quinoline. Preferred solvents are acetonitrile, dichloromethane, tetrahydrofuran or N,N-dimethylformamide. The solvents mentioned can also be employed as mixtures. It is expedient to use 5–20 parts by weight of solvent per part by weight of the reactants.

Examples of bases suitable as the catalyst are the alkali metals themselves, such as lithium, sodium or potassium, and their hydroxides and carbonates, or alkali metal amides, such as lithium amide, sodium amide or potassium amide, alkali metal hydrides, such as lithium hydride, sodium hydride or potassium hydride, or alkaline earth metal or alkali metal alcoholates, which derive in particular from primary, secondary or tertiary aliphatic alcohols having 1 to 10 carbon atoms, for example lithium, sodium or potassium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and also organic aliphatic, aromatic or heterocyclic nitrogen bases, including, for example, diazabicyclooctane, diazabicycloundecene and 4-dimethylaminopyridine, and also trialkylamines, such as trimethylamine or triethylamine, for example. It is also possible to use a mixture of two or more of said bases.

Preference is given to the organic nitrogen bases, for example diazabicyclooctane, diazabicycloundecene and, in particular, 4-dimethylaminopyridine.

The reaction is expediently carried out at atmospheric pressure and at temperatures between 10° C. and 100° C., in particular between 14° C. and 40° C.

Following this, the compounds of the formulae (I) and (IIa) or (IIb) are mixed homogeneously in an inert liquid in accordance with generally known methods, in the desired molar proportions and in dry form or as a suspension or solution.

If the compounds of the formulae (I) and (IIa) or (IIb) are mixed as supension or solution in an inert liquid, then the inert liquid expediently used may, for example, be one of the following solvents: ethers, such as tetrahydrofuran or dioxane, or glycol ethers, such as ethylene glycol methyl ether, ethylene glycol ethyl ether, diethylene glycol monomethyl ether or diethylene glycol monoethyl ether, polyalcohols, such as polyethylene glycol, ketones, such as acetone, ethyl methyl ketone, isobutyl methyl ketone or cyclohexanone, and also dipolar aprotic solvents, such as acetonitrile, benzonitrile, N,N-dimethylformamide, N,N-dimethylacetamide, nitrobenzene, N-methylpyrrolidone, dimethylsulfoxide, halogenated aliphatic hydrocarbons, such as trichloroethane, dichloromethane or chloroform, aromatic hydrocarbons, such as benzene or alkyl-, alkoxy- or halo-substituted benzene, such as toluene, xylene, anisole or chlorobenzene, aromatic N-heterocycles, such as pyridine, picoline or quinoline, high-boiling aliphatic hydrocarbons, such as decalin, n-dodecane or kerosine, or mixtures thereof. Preferred solvents are toluene, xylene, diphenyl ether, N-methylpyrrolidone, N,N-dimethylformamide, dimethyl sulfoxide and quinoline.

The concentration of the compounds of the formulae (I) and (IIa) or (IIb) in the inert liquid can vary greatly depending on the inert liquid used. It is expedient to employ the compound of the formulae (I) and (IIa) or (IIb) in a concentration of from 0.1 to 20.% by weight, preferably 0.2 to 5% by weight, based on the overall solution.

From the dry, suspended or dissolved mixture of the pigment precursors of the formulae (VIII) and (IX) or (X) it is possible to obtain the novel single-phase solid solutions consisting of the compounds of the formulae (I) and (IIa) or (IIb) in a very simple manner, either by treating the dry, suspended or dissolved mixture a) thermally, i.e. for example by heating at temperatures between 50° C. and 400° C., preferably between 100° C. and 200° C. or by laser irradiation, b) photolytically, i.e. for example by exposure with wavelengths below 375 nm, or c) chemically, i.e. for example with organic or inorganic acids, for example acetic, toluenesulfonic, trifluoroacetic, hydrochloric or sulfuric acid, and isolating the resulting product by customary methods.

The treatment methods a), b) and c) can be used individually or else combined. Preference is given to the thermal treatment a) and to the combination of the thermal treatment a) with the chemical treatment c).

The novel single-phase solid solutions are preferably prepared by intensive grinding, alkaline reprecipitation or by the method described above, via the pigment precursors of the formulae (VIII) and (IX) or (X). Particular preference attaches to alkaline reprecipitation and, especially, to the method involving the pigment precursors.

As already mentioned, the X-ray diffraction diagram of the novel single-phase solid solutions is characterized by the exclusive presence of the lines of the asymmetric component of the formula (I). Slight deviations in the peak for twice the Bragg angle in comparison with the X-ray diffraction diagram of the pure host may be observed, especially when the guest is present in high concentration; these deviations are not more than 0.3 2Θ as an average of the absolute values for all peaks, and up to about ±0.8 2Θ for individual peaks. Such shifts, however, are caused by the alteration of the chemical composition and should in no case be interpreted as suggesting that the crystal structure of the host has in any way been altered. The mid-peak widths and the relative intensities of the lines of twice the Bragg angle may likewise vary slightly. Preference is given to novel single-phase solid solutions of high crystallinity, characterized by lines having an average mid-peak width of $\leq 1.0$ 2Θ, particularly preferably $\leq 0.8$ 2Θ, in their X-ray diffraction diagram. Preferably, the absolute values of the deviations of the peaks of twice the Bragg angle in comparison to the X-ray diffraction diagram of the pure host are $\leq 0.2$ 2Θ as an average of all peaks and $\leq 0.4$ 2Θ in the case of individual peaks.

By the formation of the novel single-phase solid solutions it is possible to obtain advantageous shifts in shade which are of very great interest. In contrast to the known multiphase solid solutions described in the introduction, the pigments obtained surprisingly have very good pigmentary properties, and in particular have high light stability and weather stability and a precisely reproducible shade. Another advantage is that the crystal lattice of the asymmetric host, in contrast to the crystal lattice of symmetrical hosts, is, surprisingly, essentially retained, so that the host can be selected simply on the basis of its known properties, for example its surface characteristics, good fastness properties or clean shade. One of the functions of the guest is to modify the shade of the monophase solid solution to the desired colour.

In order to optimize their pigmentary properties, the novel single-phase solid solutions may after they have been formed be subjected to additional thermal treatment or can be recrystallized.

Recrystallization and/or thermal treatment, if practised, takes place in accordance with methods customary for pigments. Such treatment generally involves thermal aftertreatment in water or in an organic solvent, at atmospheric or superatmospheric pressure. Use is preferably made of organic solvents, for example halo- alkyl- or nitro-substituted benzenes, such as xylenes, chlorobenzene, o-dichlorobenzene or nitrobenzene, and of pyridine bases, such as pyridine, picoline or quinoline, and also of ketones, such as cyclohexanone, of alcohols, such as isopropanol, butanols or pentanols, of ethers, such as ethylene glycol monomethyl or monoethyl ether, of amides, such as dimethylformamide or N-methylpyrrolidone, or of dimethyl sulfoxide or sulfolane. The aftertreatment can also be carried out in water, under atmospheric or superatmospheric pressure, in the presence of organic solvents and/or with the addition of surface-active substances.

The novel solid solutions can be used as pigments for colouring high molecular mass organic material.

Examples of high molecular mass organic materials which can be coloured or pigmented with the novel single-phase solid solutions are cellulose ethers, cellulose esters, such as ethylcellulose, nitrocellulose, cellulose acetate and cellulose butyrate, natural resins or synthetic resins, such as addition polymerization resins or condensation polymerization resins, such as amino resins, especially urea-formaldehyde and melamine-formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or in mixtures.

The abovementioned high molecular mass organic compounds can be present, individually or in mixtures, as plastic masses, as melts or in the form of spinning solutions, varnishes, coating materials or printing inks. Depending on the intended use it may prove advantageous to employ the novel single-phase solid solutions as toners, or in the form of preparations. Organic high molecular mass materials coloured with the novel single-phase solid solutions possess outstanding colour properties. This invention therefore also provides a composition comprising a novel single-phase solid solution and a high molecular mass organic material.

Based on the high molecular mass organic material to be pigmented the novel single-phase solid solutions can be employed in an amount of from 0.01 to 30% by weight, preferably from 0.1 to 10% by weight.

The pigmenting of the high molecular mass organic substances with the novel single-phase solid solutions is carried out, for example, by mixing such solid solutions, in the form of masterbatches if desired, into these substrates using roller assemblies, mixers or milling apparatus. The pigmented material is subsequently brought into the desired final form by methods known per se, such as calandering, compression moulding, extrusion, coating, casting or injection moulding. So as to produce non-rigid mouldings, or to reduce their brittleness, it is often desirable to incorporate plasticizers into the high molecular mass compounds prior to their forming. Examples of compounds which can be used as such plasticizers are esters of phosphoric acid, phthalic acid or sebacic acid. The plasticizers can be incorporated into the polymers before or after the incorporation of the novel single-phase solid solutions. In order to achieve different colour effects, it is also possible to add to the high molecular mass organic substances not only the novel single-phase solid solutions but also fillers, reflecting metallic or inorganic particles, for example aluminium flakes or mica, and/or other colour-imparting constituents, such as white, coloured or black pigments, in any desired quantities.

For the pigmentation of varnishes, coating materials and printing inks, the high molecular mass organic materials and the novel single-phase solid solutions, together if desired with additives such as fillers, other pigments, siccatives or plasticizers, are finely dispersed or dissolved in an organic solvent or solvent mixture for them both. In this context it is possible to follow a procedure in which the individual components are dispersed or dissolved individually or else two or more of them are dispersed or dissolved together and only then to combine all of the components.

The novel single-phase solid solutions are particularly suitable for colouring plastics, especially polyvinyl chloride and polyolefins, and for colouring paints, preferably automotive or metallic finishes, for example those containing metal particles or mica particles.

In colouring applications, for example of polyvinyl chloride or polyolefins, the novel single-phase solid solutions are notable for good general pigmentary properties, such as good dispersibility, high colour strength and cleanness, good fastness to migration, heat, light and weathering, and good opacity.

The examples which follow illustrate the invention:

EXAMPLE 1

A mixture of 0.53 g (1.4 mmol) of 2,9-dichloroquinacridone, 2.12 g (5.6 mmol) of 1,4-diketo-3-(4-tert-butylphenyl)-6-(4-chlorophenyl)-2,5-dihydropyrrolo[3,4-c]pyrrole and 1.18 g of potassium hydroxide in 40 ml of dimethyl sulfoxide is heated to 50° C. and stirred at this temperature for 2 hours. The reaction mixture is then added dropwise over the course of ¼ h to a solution of 0.7 ml of conc. sulfuric acid in 40 ml of methanol and 120 ml of water, and the mixture is heated at 60° C. with stirring for 5 hours. The red supension is filtered and the residue is washed with methanol and then water and dried in vacuo at 60° C., to give 2.3 g (87% of theory) of a red powder.

| Analysis: | C | H | N | Cl |
|---|---|---|---|---|
| calc.: | 68.40% | 4.57% | 7.38% | 11.21% |
| found: | 67.14% | 4.69% | 7.15% | 11.04% |

The complete X-ray diffraction diagrams are determined in accordance with customary methods using a Siemens D500® X-ray diffractometer (CuK$_\alpha$ radiation).

The X-ray diffraction diagram is characterized by the following diffraction lines:

| Interplanar spacings [d in Å] | twice the Bragg angle [2Θ] | relative intensity [%] |
|---|---|---|
| 20.7870 | 4.25 | 100 |
| 6.5758 | 13.45 | 29 |
| 4.9359 | 17.96 | 88 |
| 3.6466 | 24.39 | 22 |
| 3.3364 | 26.70 | 85 |
| 3.0539 | 29.22 | 20 |

This X-ray diffraction diagram is virtually identical with that of 1,4-diketo-3-(4-tert-butylphenyl)-6-(4-chlorophenyl)-2,5-dihydro-pyrrolo[3,4-c]pyrrole, which is characterized by the following diffraction lines:

| Interplanar spacings [d in Å] | twice the Bragg angle [2Θ] | relative intensity [%] |
|---|---|---|
| 20.3166 | 4.35 | 100 |
| 6.5391 | 13.53 | 22 |
| 4.9139 | 18.04 | 83 |
| 3.6357 | 24.46 | 15 |
| 3.3300 | 26.75 | 81 |
| 3.0498 | 29.26 | 17 |

EXAMPLE 2

A mixture of 0.86 g (3 mmol) of 1,4-diketo-3,6-diphenyl-2,5-dihydropyrrolo[3,4-c]pyrrole, 2.36 g (7 mmol) of 1,4-diketo-3-(4-chlorophenyl)-6-(4-methylphenyl)-2,5

-dihydro-pyrrolo[3,4-c]pyrrole and 1.68 g of potassium hydroxide in 60 ml of dimethyl sulfoxide is heated to 50° C. and stirred at this temperature for 2 hours. The reaction mixture is then introduced into a solution of 0.9 ml of conc. sulfuric acid, 60 ml of methanol and 120 ml of water and the mixture is stirred at 60° C. for 6 hours. The red suspension is filtered and the residue is washed with methanol and then water and dried in vacuo at 60° C., to give 2.8 g (87% of theory) of a red powder.

| Analysis | C | H | N | Cl |
|---|---|---|---|---|
| calc.: | 69.70% | 3.97% | 8.69% | 7.70% |
| found: | 69.47% | 3.98% | 8.46% | 7.61% |

The X-ray diffraction diagram is characterized by the following diffraction lines:

| Interplanar spacings [d in Å] | twice the Bragg angle [2Θ] | relative intensity [%] |
|---|---|---|
| 15.5890 | 5.67 | 83 |
| 7.6648 | 11.54 | 11 |
| 6.4784 | 13.66 | 22 |
| 5.9761 | 14.81 | 53 |
| 5.0935 | 17.40 | 12 |
| 4.9295 | 17.98 | 10 |
| 3.8330 | 23.19 | 27 |
| 3.7103 | 23.97 | 16 |
| 3.2959 | 27.03 | 100 |
| 3.1292 | 28.50 | 14 |
| 3.0635 | 29.13 | 12 |
| 2.9849 | 29.91 | 16 |
| 2.6988 | 33.17 | 9 |
| 2.1715 | 41.55 | 8 |

This X-ray diffraction diagram is virtually identical with that of 1,4-diketo-3-(4-chlorophenyl)-6-(4-methylphenyl)-2,5-dihydropyrrolo[3,4-c]pyrrole, which is characterized by the following diffraction lines:

| Interplanar spacings [d in Å] | twice the Bragg angle [2Θ] | relative intensity [%] |
|---|---|---|
| 15.3634 | 5.75 | 100 |
| 7.6399 | 11.57 | 23 |
| 6.4688 | 13.68 | 15 |
| 5.9654 | 14.84 | 35 |
| 5.0854 | 17.43 | 10 |
| 4.9062 | 18.07 | 7 |
| 3.8443 | 23.12 | 18 |
| 3.6949 | 24.07 | 10 |
| 3.2898 | 27.08 | 58 |
| 3.1260 | 28.53 | 10 |
| 3.0456 | 29.30 | 12 |
| 3.0085 | 29.67 | 14 |
| 2.6832 | 33.37 | 7 |
| 2.1752 | 41.48 | 10 |

EXAMPLE 3

A mixture of 0.72 g (2.5 mmol) of 1,4-diketo-3,6-diphenyl-2,5-dihydropyrrolo[3,4-c]pyrrole, 1.68 g (5.0 mmol) of 1,4-diketo-3-(4-chlorophenyl)-6-(3-methylphenyl)-2,5-dihydro-pyrrolo[3,4-c]pyrrole and 0.66 g of sodium hydroxide in 75 ml of dimethyl sulfoxide is heated to 50° C. and stirred at this temperature overnight. The reaction mixture is then introduced into a solution, cooled to 0° C., of 1.69 ml of conc. sulfuric acid in 150 ml of water, and stirring is continued for 6 hours. The red suspension is filtered and the residue is washed with methanol and with water and dried in vacuo at 80° C., to give 1.6 g (67% of theory) of a red powder.

| Analysis | C | H | N | Cl |
|---|---|---|---|---|
| calc.: | 70.17% | 3.99% | 8.79% | 7.02% |
| found.: | 69.45% | 4.10% | 8.68% | 7.49% |

The X-ray diffraction diagram is characterized by the following diffraction lines:

| Interplanar spacings [d in Å] | twice the Bragg angle [2Θ] | relative intensity [%] |
|---|---|---|
| 15.2279 | 5.80 | 100 |
| — | ~12 | <10 |
| 6.6825 | 13.24 | 25 |
| 6.1163 | 14.47 | 73 |
| 4.9866 | 17.77 | 24 |
| 3.7645 | 23.62 | 29 |
| — | ~25 | <10 |
| 3.3240 | 26.80 | 94 |
| 3.0573 | 29.19 | 20 |

This X-ray diffraction diagram is virtually identical with that of 1,4-diketo-3-(4-chlorophenyl)-6-(3-methylphenyl)-2,5-dihydropyrrolo[3,4-c]pyrrole, which is characterized by the following diffraction lines:

| Interplanar spacings [d in Å] | twice the Bragg angle [2Θ] | relative intensity [%] |
|---|---|---|
| 15.2884 | 5.78 | 100 |
| 7.5655 | 11.69 | 13 |
| 6.8201 | 12.97 | 24 |
| 6.2102 | 14.25 | 54 |
| 5.0440 | 17.57 | 24 |
| 3.6942 | 24.07 | 22 |
| — | ~25 | <10 |
| 3.3300 | 26.75 | 80 |
| 3.1414 | 28.39 | 17 |

EXAMPLE 4

The procedure of Example 1 is repeated but replacing 1.4 mmol of 2,9-dichloroquinacridone by 1.4 mmol of 2,9-dimethylquinacridone. A red powder is likewise obtained, whose X-ray diffraction diagram is virtually identical with that of 1,4-diketo-3-(4-tert-butylphenyl)-6-(4-chlorophenyl)-2,5-dihydropyrrolo[3,4-c]pyrrole.

EXAMPLE 5

The procedure of Example 2, is repeated but using 3.3 mmol of 1,4-diketo-3,6-diphenyl-2,5-dihydropyrrolo[3,4-c]pyrrole and 6.7 mmol of 1,4-diketo-3-(4-chlorophenyl)-6-(3-methylphenyl)-2,5-dihydropyrrolo[3,4-c]pyrrole. A red powder is obtained whose X-ray diffraction diagram is virtually identical with that of 1,4-diketo-3-(4-chlorophenyl)-6-(3-methylphenyl)-2,5-dihydropyrrolo[3,4-c]pyrrole.

EXAMPLE 6

The procedure of Example 2 is repeated but using 4 mmol of 1,4-diketo-3,6-diphenyl-2,5-dihydropyrrolo[3,4-c]pyrrole and 6 mmol of 1,4-diketo-3-(4-chlorophenyl)-6-(3-methylphenyl)-2,5-dihydropyrrolo[3,4-c]pyrrole. A red powder is obtained whose X-ray diffraction diagram is virtually identical to that of 1,4-diketo-3-(4-chlorophenyl)-6-(3-methylphenyl)-2,5-dihydropyrrolo[3,4-c]pyrrole.

EXAMPLE 7A 3.23 g (26.4 mmol) of 4-dimethylaminopyridine are added to a mixture of 14.75 g (51.2 mmol) of 1,4-diketo-3,6-diphenyl-2,5-dihydropyrrolo[3,4-c]pyrrole and 27.94 g (128 mmol) of di-tert-butyl dicarbonate in 500 ml of tetrahydrofuran. The red suspension obtained is stirred at room temperature for 2 hours with exclusion of atmospheric moisture. The solvent is removed by distillation under reduced pressure. The yellow residue is washed with a little methanol and dried at room temperature in vacuo, to give 23.8 g (95% of theory) of yellow N,N-di-(tert-butoxycarbonyl)-1,4-diketo-3,6-diphenyl-2,5-dihydropyrrolo[3,4-c]pyrrole.

| Analysis: | | | |
|---|---|---|---|
| | C | H | N |
| calc.: | 68.84% | 5.78% | 5.73% |
| found: | 68.71% | 5.79% | 5.71% |

EXAMPLE 7B

The procedure of Example 7A is repeated but replacing the 1,4-diketo-3,6-diphenyl-2,5-dihydropyrrolo[3,4-c]pyrrole by 17.23 g (51.2 mmol) of 1,4-diketo-3-(4-chlorophenyl)-6-3-methylphenyl)-2,5-dihydropyrrolo[3,4-c]pyrrole and extending the reaction time from 2 hours to 30 hours. This gives 23.4 g (85% of theory) of bright yellow N,N-di-(tert-butoxycarbonyl)-1,4-diketo-3-(4-chlorophenyl)-6-(3-methylphenyl)-2,5-dihydropyrrolo[3,4-c]pyrrole.

| Analysis: | | | | |
|---|---|---|---|---|
| | C | H | N | Cl |
| calc.: | 64.86% | 5.44% | 5.22% | 6.60% |
| found: | 64.50% | 5.62% | 5.11% | 6.43% |

Example 7C

A mixture of 1.95 g (4 mmol) of N,N-di-(tert-butoxycarbonyl)-1,4-diketo-3,6-diphenyl-2,5-dihydropyrrolo[3,4-c]pyrrole, prepared as in Example 7A, and 4.30 g (8 mmol) of N,N-di-(tert-butoxycarbonyl)-1,4-diketo-3-(4-chlorophenyl)-6-(3-methylphenyl)-2,5-dihydropyrrolo[3,4-c]pyrrole, prepared as in Example 7B, is dissolved with stirring at 60° C. in 200 ml of toluene. Following the addition of 5.8 g of 4-toluenesulfonic acid, the mixture is briefly heated to 105° C. and then allowed to cool to room temperature. The suspension is filtered and the residue is washed first with methanol and then with water and dried in vacuo at 80° C., to give 3.2 g (83% of theory) of an orange-coloured powder.

| Analysis: | | | | |
|---|---|---|---|---|
| | C | H | N | Cl |
| calc.: | 70.17% | 3.99% | 8.79% | 7.02% |
| found: | 69.17% | 4.18% | 8.51% | 7.41% |

The X-ray diffraction diagram is characterized by the following diffraction lines:

| Interplanar spacing [d in Å] | twice the Bragg angle [2Θ] | relative intensity [%] |
|---|---|---|
| 15.0546 | 5.87 | 100 |
| 7.4994 | 11.79 | 9 |
| 6.7261 | 13.15 | 15 |
| 6.1222 | 14.46 | 48 |
| 4.9972 | 17.73 | 20 |
| 3.7475 | 23.72 | 17 |
| 3.5946 | 24.75 | 9 |
| 3.3249 | 26.79 | 68 |
| 3.0735 | 29.03 | 12 |

This X-ray diffraction diagram is virtually identical with that of 1,4-diketo-3-(4-chlorophenyl)-6-(3-methylphenyl)-2,5-dihydropyrrolo[3,4-c]pyrrole.

Example 8A

The procedure of Example 7B is repeated but replacing 1,4-diketo-3-(4-chlorophenyl)-6-(3-methylphenyl)-2,5-dihydropyrrolo[3,4-c]pyrrole with 1,4-diketo-3-(4-chlorophenyl)-6-(4-methylphenyl)-2,5-dihydropyrrolo[3,4-c]pyrrole, to give bright yellow N,N-di-(tert-butoxycarbonyl)-1,4-diketo-3-(4-chlorophenyl)-6-(4-methylphenyl)-2,5-dihydropyrrolo[3,4-c]pyrrole.

| Analysis: | | | | |
|---|---|---|---|---|
| | C | H | N | Cl |
| calc.: | 64.86% | 5.44% | 5.22% | 6.60% |
| found: | 64.35% | 5.70% | 5.10% | 6.45% |

Example 8B

The procedure of Example 7C is repeated but replacing N,N-di-(tert-butoxycarbonyl)-1,4-diketo-3-(4-chlorophenyl)-6-(3-methylphenyl)-2,5-dihydropyrrolo[3,4-c]pyrrole by N,N-di-(tert-butoxycarbonyl)-1,4-diketo-3-(4-chlorophenyl)-6-(4-methylphenyl)-2,5-dihydropyrrolo[3,4-c]pyrrole, prepared as in Example 8A, to give 3.1 g (80% of theory) of a red powder.

| Analysis: | | | | |
|---|---|---|---|---|
| | C | H | N | Cl |
| calc.: | 70.17% | 3.99% | 8.79% | 7.02% |
| found: | 69.17% | 4.11% | 8.60% | 7.26% |

The X-ray diffraction diagram is characterized by the following diffraction lines:

| Interplanar spacings [d in Å] | twice the Bragg angle [2Θ] | relative intensity [%] |
|---|---|---|
| 15.1873 | 5.82 | 100 |
| 7.5993 | 11.64 | 12 |
| 6.4423 | 13.74 | 16 |
| 5.9374 | 14.91 | 48 |
| 5.0610 | 17.51 | 13 |
| 4.8989 | 18.09 | 9 |
| 3.8184 | 23.28 | 21 |
| 3.7018 | 24.02 | 12 |
| 3.2798 | 27.17 | 76 |
| 3.1160 | 28.63 | 10 |

-continued

| Interplanar spacings [d in Å] | twice the Bragg angle [2Θ] | relative intensity [%] |
|---|---|---|
| 3.0461 | 29.30 | 10 |
| 2.9827 | 29.93 | 14 |
| 2.6876 | 33.31 | 8 |
| 2.1658 | 41.67 | 8 |

This X-ray diffraction diagram is virtually identical with that of 1,4-diketo-3-(4-chlorophenyl)-6-(4-methylphenyl)-2,5-dihydropyrrolo[3,4-c]pyrrole.

EXAMPLES 9–24

The procedure described in Example 2 is repeated but using, as guest, a compound of the formula (IIa) (instead of 1,4-diketo-3,6-diphenyl-2,5-dihydropyrrolo[3,4-c]pyrrole) and, as host, a compound of the formula (I) (instead of 1,4-diketo-3-(4-chlorophenyl)-6-(4-methylphenyl)-2,5-dihydropyrrolo[3,4-c]pyrrole), where $G_1$ to $G_4$ and the respective molar ratio are indicated in the table below. In all cases, single-phase solid solutions are obtained.

1.5 g of zirconium octoate,
18.5 g of ®SOLVESSO 150 (ESSO),
21.5 g of butyl acetate and
17.5 g of xylene.

36.5 g of polyester resin ®DYNAPOL H700 (Dynamit Nobel), 4.6 g of melamine resin ®MAPRENAL MF650 (Hoechst) and 2.5 g of dispersant ®DISPERBYK160 (Byk Chemie) are dispersed together in a shaker machine for 90 minutes (total coating material 150 g; 5% pigment).

27.69 g of the resulting masstone paint are mixed, for the base coat, with 17.31 g of aluminium stock solution (8%) consisting of 12.65 g of ®SILBERLINE SS 3334AR, 60% (Silberline Ltd.)
56.33 g of CAB solution (composition as above),
20.81 g of polyester resin ®DYNAPOL H700,
2.60 g of melamine resin ®MAPRENAL MF650 and
7.59 g of ®SOLVESSO 150, and the mixture is applied by spraying to an aluminum panel (wet film about 20 μm). After an evaporation time of 30 minutes at room temperature, a thermosetting acrylic varnish consisting of

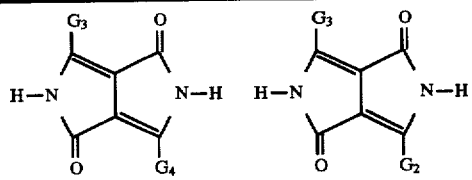

| | (IIa) = Guest | | (I) = Host | | Molar ratio | Colour of masstone lacquer |
|---|---|---|---|---|---|---|
| Example | $G_3$ | $G_4$ | $G_1$ | $G_2$ | Guest to Host | |
| 9 | 4-Chlorophenyl | 4-Chlorophenyl | 4-Chlorophenyl | 4-tert-Butylphenyl | 20%:80% | red |
| 10 | 4-Chlorophenyl | 4-Chlorophenyl | 4-Chlorophenyl | 3-Methylphenyl | 18%:82% | orange |
| 11 | 4-Chlorophenyl | Phenyl | 4-Chlorophenyl | 3-Methylphenyl | 47%:53% | orange |
| 12 | 4-Chlorophenyl | Phenyl | 4-Chlorophenyl | 4-tert-Butylphenyl | 40%:60% | red |
| 13 | Phenyl | Phenyl | Phenyl | 4-Biphenylyl | 40%:60% | red |
| 14 | Phenyl | Phenyl | Phenyl | 4-Biphenylyl | 50%:50% | red |
| 15 | Phenyl | Phenyl | Phenyl | 4-tert-Butylphenyl | 16%:84% | red |
| 16 | 4-Chlorophenyl | 4-Chlorophenyl | Phenyl | 4-tert-Butylphenyl | 20%:80% | red |
| 17 | 4-Chlorophenyl | Phenyl | 4-Chlorophenyl | 4-Biphenylyl | 20%:80% | red |
| 18 | 4-Chlorophenyl | 4-Chlorophenyl | 4-Chlorophenyl | 4-Biphenylyl | 20%:80% | red |
| 19 | Phenyl | Phenyl | 4-Chlorophenyl | 4-Biphenylyl | 20%:80% | red |
| 20 | 4-Cyanophenyl | 4-Cyanophenyl | Phenyl | 4-tert-Butylphenyl | 15%:85% | red |
| 21 | 4-Chlorophenyl | 4-Chlorophenyl | Phenyl | 3,4-Dichlorophenyl | 16%:84% | orange |
| 22 | 4-Chlorophenyl | 4-Chlorophenyl | 4-Chlorophenyl | 3,4-Dichlorophenyl | 15%:85% | red-orange |
| 23 | Phenyl | Phenyl | 4-Chlorophenyl | 3-Cyanophenyl | 20%:80% | orange |
| 24 | 3-Cyanophenyl | 3-Cyanophenyl | Phenyl | 4-tert-Butylphenyl | 15%:85% | red |

EXAMPLE 25

7.5 g of the mixed crystal from Example 1, 98.9 g of CAB solution consisting of
41.0 g of cellulose acetobutyrate ®CAB 531.1, 20% in butanol/xylene 2:1 (Eastman Chem.), 29.60 g of acrylic resin ®URACRON 2263 XB, 50% in xylene-butanol (Chem. Fabrik Schweizerhalle),
2.75 g of butylglycol acetate,
5.80 g of melamine resin ®CYMEL 327, 90% in isobutanol, 5.70 g of xylene, 1.65 g of n-butanol, 0.50 g of silicone fluid, 1% in xylene, 3.00 g of light stabilizer ®TINUVIN 900, 10% in xylene (Ciba) and 1.00 g of light stabilizer ®TINUVIN 292, 10% in xylene (Ciba), is applied by spraying as topcoat (wet film about 50 μm). After a further 30 minutes of evaporation at room temperature, the coating is baked at 130° C. for 30 minutes.

EXAMPLE 26

0.6 g of the single-phase solid solution from Example 2 is mixed with 67 g of polyvinyl chloride, 33 g of dioctyl phthalate, 2 g of dibutyltin dilaurate and 2 g of titanium dioxide and processed on a roller bed at 160° C. for 15 minutes to form a thin film. The red PVC film thus produced is very strong in colour and very fast to migration and light.

EXAMPLE 27

1000 g of polypropylene granules (®DAPLEN PT-55, Chemie LINZ) and 20 g of a 50% pigment preparation consisting of 10 g of the single-phase solid solution of Example 3 and 10 g of magnesium behenate, are subjected to intense mixing in a mixing drum. The granules thus treated are spun at 260° to 285° C. by the melt-spinning technique, to give orange-coloured fibres with very good light fastness and textile fastness properties.

For colouring high molecular mass organic material it is possible, in analogy to Examples 25–27, to employ rather than the products of Examples 1–3 the products, for example, of Examples 4–24 as well.

What is claimed is:

1. A solid solution consisting of 60–90 mol-% of an asymmetric 2,5-dihydro-1,4-diketopyrrolo[3,4-c]pyrrole of the formula (I)

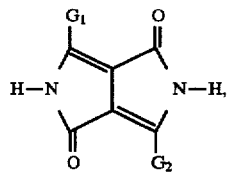
(I)

in which $G_1$ and $G_2$ independently of one another are different radicals

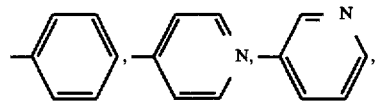

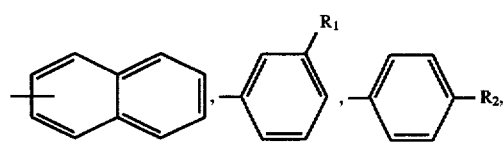

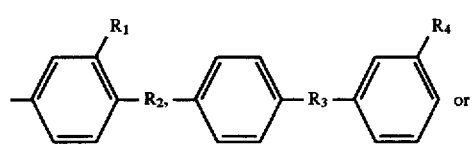

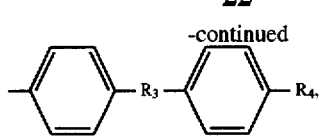

where $R_1$ and $R_2$ independently of one another are fluorine, chlorine, bromine, cyano, nitro, trifluoromethyl, $C_1$-$C_8$alkyl, $C_5$-$C_6$cycloalkyl, phenyl, $C_1$-$C_8$alkoxy, $C_1$-$C_8$alkoxycarbonyl, $C_1$-$C_8$alkylamino, $C_1$-$C_8$alkylaminocarbonyl, $C_1$-$C_8$dialkylamino, $C_1$-$C_8$dialkylaminocarbonyl or morpholino, $R_3$ is —O—, —NR$_5$—, —N=N— or —SO$_2$—, $R_4$ is hydrogen, fluorine, chlorine, bromine, cyano, nitro, trifluoromethyl, $C_1$-$C_8$alkyl, $C_1$-$C_8$alkoxy, $C_1$-$C_8$alkylamino, $C_1$-$C_8$dialkylamino, $C_1$-$C_8$alkoxycarbonyl, $C_1$-$C_8$alkylaminocarbonyl or $C_1$-$C_8$dialkylaminocarbonyl, and $R_5$ is hydrogen, methyl or ethyl, with the proviso that, if one of the radicals, $G_1$ or $G_2$, is

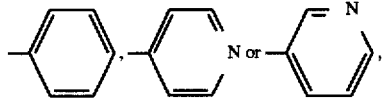

the other radical, $G_2$ or $G_1$, is not

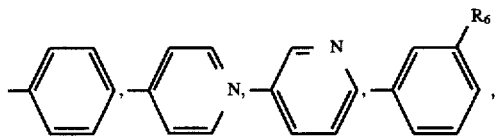

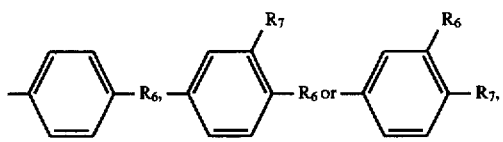

where $R_6$ is chlorine and $R_7$ fluorine or trifluoromethyl, or $R_6$ and $R_7$ independently of one another are fluorine, methyl or trifluoromethyl;

and 40–10 mol-% of a 2,5-dihydro-1,4-diketopyrrolo[3,4-c]pyrrole of the formula (IIa)

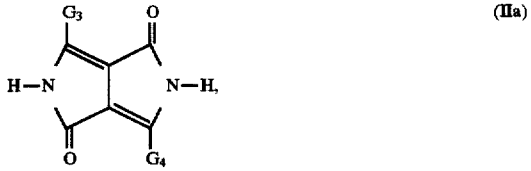
(IIa)

in which $G_3$ and $G_4$ independently of one another are identical or different radicals

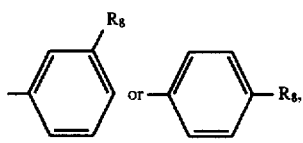

where $R_8$ is fluorine, chlorine, cyano, nitro, trifluoromethyl, $C_1$-$C_4$alkyl, $C_1$-$C_4$alkoxy, $C_1$-$C_4$alkylamino or $C_1$-$C_4$dialkylamino;

or 40–10 mol-% of a quinacridone of the formula (IIb)

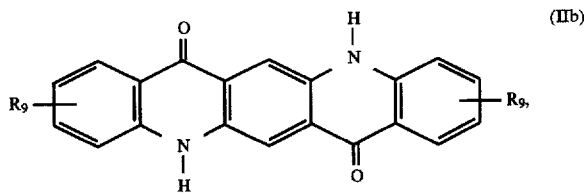

in which $R_9$ is hydrogen, halogen, $C_1$–$C_4$alkyl or $C_1$–$C_4$alkoxy;

which is a single-phase solid solution having the crystal structure of the asymmetric 2,5-dihydro-1,4-diketopyrrolo[3,4-c]pyrrole of the formula (I).

2. A solid solution according to claim 1, wherein in formula (I) $G_1$ and $G_2$ independently of one another are different radicals

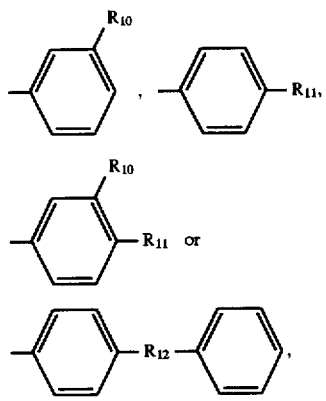

where $R_{10}$ and $R_{11}$ independently of one another are chlorine, bromine, cyano, nitro, trifluoromethyl, $C_1$–$C_8$alkyl, phenyl, $C_1$–$C_8$alkoxy, $C_1$–$C_8$alkoxycarbonyl, $C_1$–$C_8$alkylamino or $C_1$–$C_8$dialkylamino, and $R_{12}$ is —$NR_5$— or —$SO_2$—.

3. A solid solution according to claim 1, wherein in formula (I) $G_1$ is a radical

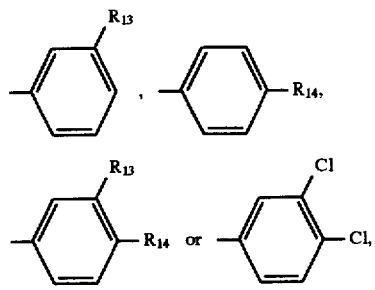

in which $R_{13}$ and $R_{14}$ are nitro, $C_4$–$C_8$alkyl, phenyl, $C_4$–$C_8$alkoxy or $C_4$–$C_8$dialkylamino.

4. A solid solution according to claim 3, wherein $R_{13}$ and $R_{14}$ are tert-butyl or phenyl.

5. A solid solution according to claim 1, wherein in formula (I) $G_1$ and $G_2$ independently of one another are different radicals

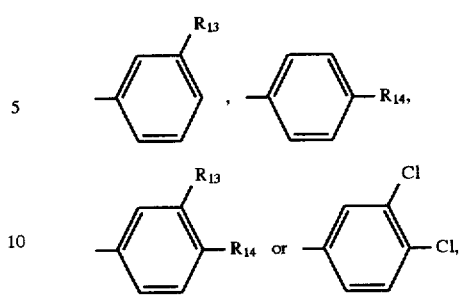

in which $R_{13}$ and $R_{14}$ are nitro, $C_4$–$C_8$alkyl, phenyl, $C_4$–$C_8$alkoxy or $C_4$–$C_8$dialkylamino.

6. A solid solution according to claim 5, wherein $R_{13}$ and $R_{14}$ are tert-butyl or phenyl.

7. A solid solution according to claim 1, wherein in formula (IIa) $G_3$ and $G_4$ independently of one another are identical or different radicals

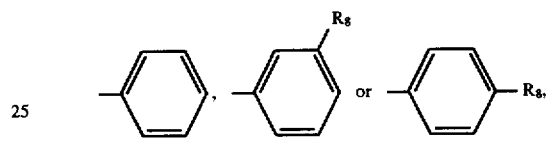

in which $R_8$ is fluorine, chlorine, cyano, nitro, trifluoromethyl, $C_1$–$C_4$alkyl, $C_1$–$C_4$alkoxy, $C_1$–$C_4$alkylamino or $C_1$–$C_4$dialkylamino.

8. A solid solution according to claim 1, wherein in formula (IIa) $G_3$ and $G_4$ independently of one another are identical or different radicals

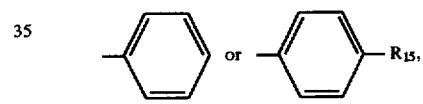

in which $R_{15}$ is chlorine, cyano, nitro, trifluoromethyl, methyl, methoxy, methylamino or dimethylamino.

9. A solid solution according to claim 1, wherein in formula (IIb) $R_9$ is hydrogen, halogen or methyl.

10. A solid solution according to claim 1, wherein formula (IIb) is unsubstituted quinacridone, 2,9-dichloroquinacridone or 2,9-dimethylquinacridone.

11. A solid solution according to claim 1, wherein the molar concentrations are 75–90 mol-% of an asymmetric 2,5-dihydro-1,4-diketopyrrolo[3,4-c]pyrrole of the formula (I) and 25–10 mol-% of a 2,5-dihydro-1,4-diketopyrrolo[3,4-c]pyrrole of the formula (IIa) or of a quinacridone of the formula (IIb).

12. A solid solution according to claim 1, wherein the molar concentrations are 75–84 mol-% of an asymmetric 2,5-dihydro-1,4-diketopyrrolo[3,4-c]pyrrole of the formula (I) and 25–16 mol-% of a 2,5-dihydro-1,4-diketopyrrolo[3,4-c]pyrrole of the formula (IIa) or of a quinacridone of the formula (IIb).

13. A solid solution according to claim 1, which after its formation has been additionally subjected to thermal treatment or to recrystallization.

14. A composition comprising a solid solution according to claim 1 and a high molecular weight organic material.

15. A method of coloring a high molecular weight organic material which comprises incorporating a tinctorially effective amount of a solid solution according to claim 1 therein.

* * * * *